US008209747B2

(12) United States Patent
Ottamalika et al.

(10) Patent No.: US 8,209,747 B2
(45) Date of Patent: Jun. 26, 2012

(54) METHODS AND SYSTEMS FOR CORRELATING RULES WITH CORRESPONDING EVENT LOG ENTRIES

(75) Inventors: Iqlas Maheen Ottamalika, San Jose, CA (US); Dario Calia, San Jose, CA (US); Steven Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1199 days.

(21) Appl. No.: 11/325,287

(22) Filed: Jan. 3, 2006

(65) Prior Publication Data

US 2007/0157302 A1 Jul. 5, 2007

(51) Int. Cl.
*H04L 29/06* (2006.01)
(52) U.S. Cl. ............................................. 726/11; 726/1
(58) Field of Classification Search .......... 726/1, 11–15; 707/204, 100, 103
See application file for complete search history.

(56) References Cited

U.S. PATENT DOCUMENTS

| | | | | | |
|---|---|---|---|---|---|
| 5,999,179 | A | * | 12/1999 | Kekic et al. | 715/734 |
| 6,167,445 | A | * | 12/2000 | Gai et al. | 709/223 |
| 6,393,473 | B1 | * | 5/2002 | Chu | 709/223 |
| 6,519,636 | B2 | * | 2/2003 | Engel et al. | 709/223 |
| 6,807,632 | B1 | * | 10/2004 | Carpentier et al. | 713/165 |
| 6,820,121 | B1 | * | 11/2004 | Callis et al. | 709/225 |
| 2002/0116642 | A1 | * | 8/2002 | Joshi et al. | 713/201 |
| 2002/0138762 | A1 | * | 9/2002 | Horne | 713/201 |
| 2002/0178146 | A1 | * | 11/2002 | Akella et al. | 707/2 |
| 2003/0078915 | A1 | * | 4/2003 | chaudhuri et al. | 707/3 |
| 2004/0039672 | A1 | * | 2/2004 | Zivic et al. | 705/36 |
| 2005/0086197 | A1 | * | 4/2005 | Boubez et al. | 707/1 |
| 2005/0114708 | A1 | * | 5/2005 | DeStefano et al. | 713/201 |
| 2005/0149584 | A1 | * | 7/2005 | Bourbonnais et al. | 707/204 |
| 2005/0149721 | A1 | * | 7/2005 | Lu | 713/154 |
| 2005/0210035 | A1 | * | 9/2005 | Kester et al. | 707/10 |
| 2005/0234909 | A1 | * | 10/2005 | Bade et al. | 707/8 |
| 2005/0262132 | A1 | * | 11/2005 | Morita et al. | 707/102 |
| 2005/0283441 | A1 | * | 12/2005 | Deshpande et al. | 705/64 |
| 2006/0130071 | A1 | * | 6/2006 | Martin et al. | 719/319 |
| 2008/0284581 | A1 | * | 11/2008 | Sheleheda et al. | 340/506 |

OTHER PUBLICATIONS

Risto Vaarandi, "A data clustering algorithm for mining patterns from event logs", Oct. 2003, IP Operations and Management, 2003. (IPOM 2003). 3rd IEEE Workshop.*

* cited by examiner

*Primary Examiner* — Kambiz Zand
*Assistant Examiner* — Michael Guirguis
(74) *Attorney, Agent, or Firm* — Stolowitz Ford Cowger LLP

(57) ABSTRACT

Methods and systems for associating an event log entry with the rule that triggered its creation are described. In one embodiment, an apparatus is described. The apparatus has an event handling device for applying a plurality of rules; an event log with a plurality of log entries, and a hash value appender for appending a hash value log entries. When the event handling device performs an application of one of the rules, an entry is created in said event log, and the hash value generator appends a unique hash value to the entry. The unique hash value corresponds to the rule that was applied.

20 Claims, 8 Drawing Sheets

Network Security Appliance 100

Flowchart 400

Event Handling Device 500

Flowchart 600

System Log Manager 700

Flowchart 800

METHODS AND SYSTEMS FOR CORRELATING RULES WITH CORRESPONDING EVENT LOG ENTRIES

BACKGROUND

1. Field of the Invention

Embodiments of the present invention relate to event handling devices that generate event logs, and specifically to network communications devices which generate syslog entries from the application of rules.

2. Related Art

Event handling devices are common. Such devices apply a particular set of rules to a given situation, in that particular set of circumstances arises, one or another of the rules in the rule set is applicable to the circumstances. One area in which these event handling devices are often used is that of network security appliances, for example, an ASA/PIX/FWSM firewall.

Network security appliances are connected to a network, or several networks, through designated interfaces. Network traffic flow through the security devices is governed by the application of a set of related rules, or an interface instruction set. These interface instruction sets in turn, are made up of many rules. The rules specify, for example, what traffic is allowed to go where, and using which protocol. Because the application of these rules to network traffic is of interest, the outcome of each individual application of rule, called an event, is recorded in a system log, or syslog.

Unfortunately, any particular syslog entry does not pinpoint exactly which rule triggered its creation. In the case of most ASA/PIX/FWSM firewalls for example, a typical log entry will specify which interface instruction set was involved in generating the syslog entry, but will not identify the exact rule. The knowledge of which rule generates a particular syslog entry can be important to, for example, a network administrator who wishes to see whether a particular rule is having the desired effect on the network. Without the ability to determine whether a particular rule is functioning or not, such a network administrator is reduced to using experimentation to determine whether rule is performing as expected.

Several approaches are currently being used as a means of addressing this particular problem. One is the idea of using sequential numbering of rules within an interface instruction set, and then appending that sequential number to the syslog entry. However should any reordering of rules occur within the interface instruction set, for example through the addition, deletion, or modification of any rule, any syslog entry that use the old ordering would no longer be accurate. Another approach would be to use a counter that increments each time a rule is added or changed. The value associated with a given rule would be appended to the syslog entry. A problem with this approach is that it is difficult to determine which value is associated with a given rule. Further, rule addition and modification across multiple devices would yield different numbers for a particular rule, unless rule entry and modification were exactly uniform, at all times. A common failing of both of these approaches is that in a network having many devices that apply these rules, every device would have to have identical numbering for their interface instruction set rules, if the scheme was to have any value to the administer at all. This, in turn, would necessitate some sort of nonvolatile storage that would store these rules across all of the devices. However, accessing nonvolatile storage is an extremely expensive operation.

Another possible solution would be to print out the entire rule that triggered a syslog entry in the syslog itself. There are several problems with this approach as well. First, it is expensive, in terms of bit operations, to concatenate a string, as well as to then transmit the now much larger syslog entry over a network. Second, whenever system receives the syslog event has to parse the string, using a string matching operation, which is also extremely expensive.

This issue is further complicated by the expansion problem. The expansion problem is simply that a rule can be assembled using object lists, where each object list has many possible valid values. As such, a system administrator can write a single rule, using object lists, that when expanded could have hundreds or potentially thousands of valid instantiations. For example, a network traffic access rule would likely specify the acceptable protocols to use for conducting traffic. The rule could simply specify the name of a defined object list, and then any protocol that appeared on that object list would be acceptable according to the rule. This rule could be written out in an expanded form, in which case it would take as many rules as there were acceptable protocols on the object list. In applications where a rule may have many different possible object lists, and the object lists themselves may have many entries, including other object lists, the total number of expanded rules within the system could be unmanageable, if they had to be handled individually.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
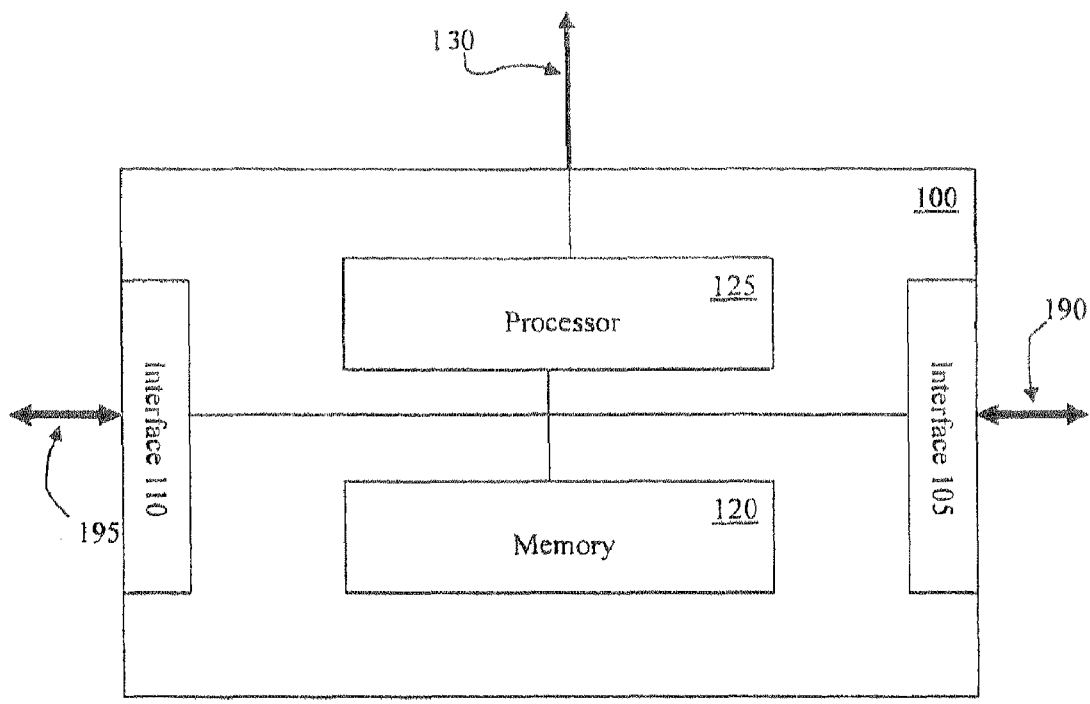
FIG. 1 depicts a network security appliance, upon which embodiments of the present invention have been implemented.

Embodiments of the present invention can be utilized to provide systems and methods that allow for the correlation of a particular rule, or expanded rule, with an entry in a system log. By using unique hash values, generated from the rules and expanded rules themselves, a concise, easy to replicate identifier is generated for every rules and expanded rule in an interface instruction set.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIGS. 4, 6, and 8) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

With reference now to FIG. 1, a network security appliance 100 is depicted, in accordance with one embodiment of the present invention. It is understood that while network security appliance 100 is depicted as having certain specific components, embodiments of the present invention can be implemented on other devices having additional components not shown in FIG. 1, or lacking some of the components depicted in FIG. 1. Additionally, it is appreciated that embodiments of the present invention are not limited to network security appliances such as network security appliance 100. Embodiments of the present invention are well suited to applications in any device, where the application of rules can result in some sort of log entry, and it is desirable to know precisely which rule generated that entry.

In some embodiments, network security appliance 100 is an ASA/PIX/FWSM firewall. In such embodiments, network security appliance 100 has at least one interface, such as interface 105 and interface 110. Interfaces 105 and 110, in some embodiments, can be physical interfaces or logical interfaces, or any combination thereof, e.g., physical interface 105 could be subdivided into numerous logical interfaces, via software. Network security appliance 100 can be connected to a network through an interface, e.g. net connection 190 through interface 105, and net connection 195 through interface 110. Network traffic reaches network security appliance 100 over one of these network connections, and passes through one of these interfaces. As is discussed below with reference to FIG. 3, traffic that passes through one of these interfaces is regulated according to one or more interface instruction sets, e.g., an access list.

In some embodiments, network security appliance 100 also includes processor 125. In such embodiments, processor 125 examines network traffic in accordance with one or more interface instruction sets, and the rules defined therein. Additionally, in some embodiments, processor 125 generates syslog entries to reflect the application of these rules to network traffic.

In some embodiments, network security appliance 100 also includes memory 120. In some such embodiments, memory 120 is utilized to store one or more interface instruction sets. Further, in some embodiments memory 120 is also used to buffer the syslog entries generated by processor 125. Additionally, in some embodiments of present invention, memory 120 stores unique hash values that correspond to the rules of the interface instruction sets. These latter embodiments are described in greater detail below, with reference to FIG. 4.

In some embodiments, network security appliance 100 includes syslog output port 130. In such embodiments, network security appliance 100 can be communicatively coupled to a management system, e.g., a syslog server or an Adaptive Security Device Manager (ASDM). In some embodiments, syslog entries are constantly streamed out through syslog output port 130. In other embodiments, syslog entries are transferred periodically in bulk. In another embodiment, syslog entries are retained inside network security appliance 100 until accessed or requested by an authorized user. In further embodiments, network security appliance 100 includes an internal syslog server (not shown), either in place of or in addition to syslog output port 130.

Figure 2:
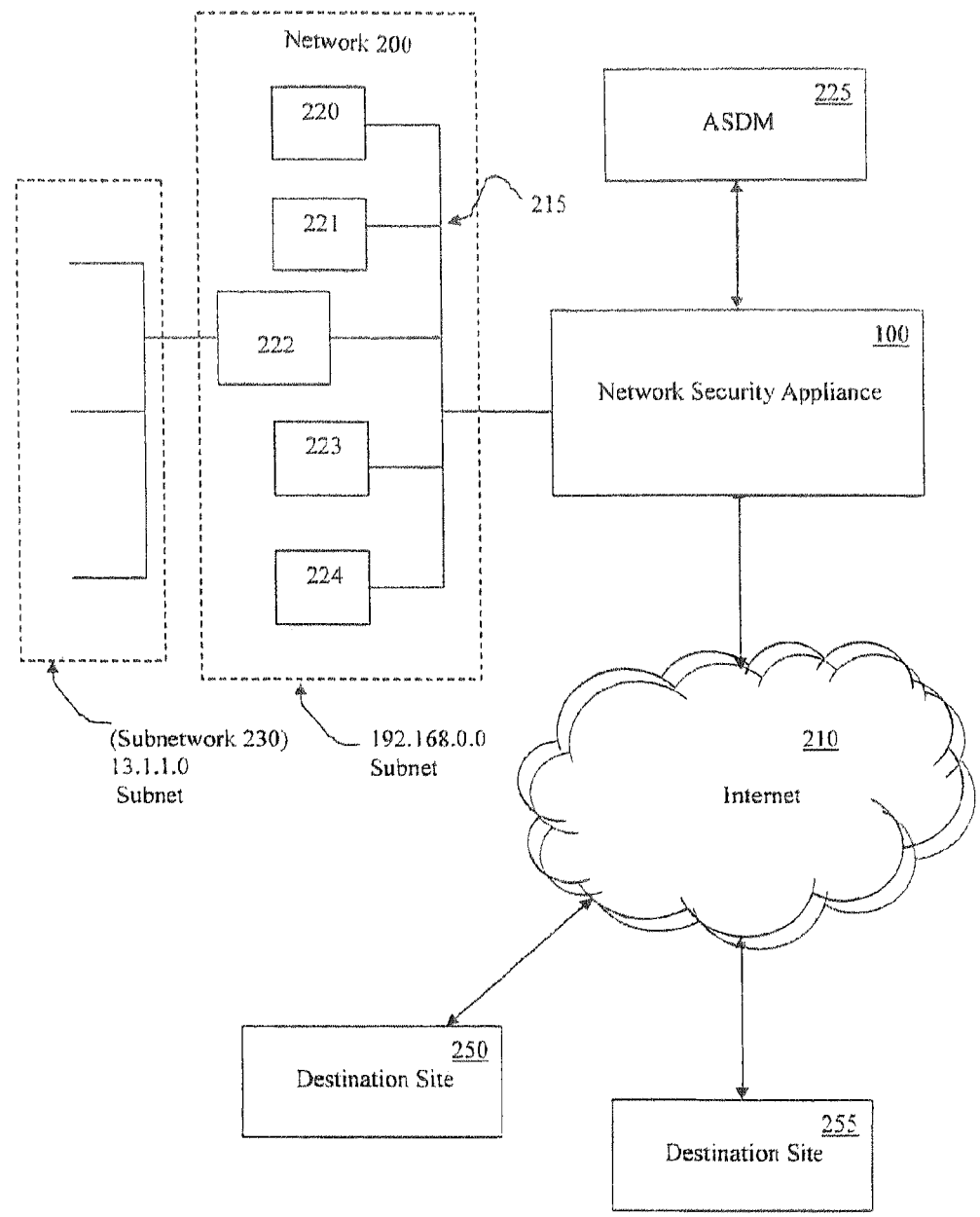
FIG. 2 depicts an exemplary network, upon which embodiments of the present invention have been implemented.

With reference now to FIG. 2, an exemplary network 200 is depicted, upon which embodiments of the present invention may be implemented. It is appreciated that while exemplary network 200 is depicted as having certain components, embodiments of the present invention may be adapted other networks, having different components, hierarchies, or organizations.

In some embodiments, network 200 incorporates a network security appliance 100. Network traffic that flows into network security appliance 100 along a network connection, e.g., network connection 195 (FIG. 1), is subject to the interface instruction set for the interface that network connection enters through. In other embodiments, multiple network security appliances, such as network security appliance 100, can be used to provide for larger or more robust network structure. In some embodiments, the functionality provided by network security appliance 100 can be incorporated into another network communications device.

As shown in FIG. 2, network 200 is interconnected by network infrastructure 215. A number of client systems, client computers 220, 221, 223, and 224, are communicatively interconnected by network infrastructure 215. Additionally, a subnetwork 230 is connected to network 200 by a network communications device 222. Network 200 is coupled to network security appliance 100 via network connection 195. Network security appliance 100 is connected to ASDM 225 via syslog output port 130 (as shown in FIG. 1). Network security appliance 100, and therefore network 200, is connected to the Internet 210 via network connection 190. Two specific destination sites, site 250 and site 255, can be reached via the Internet 210.

Figure 3:
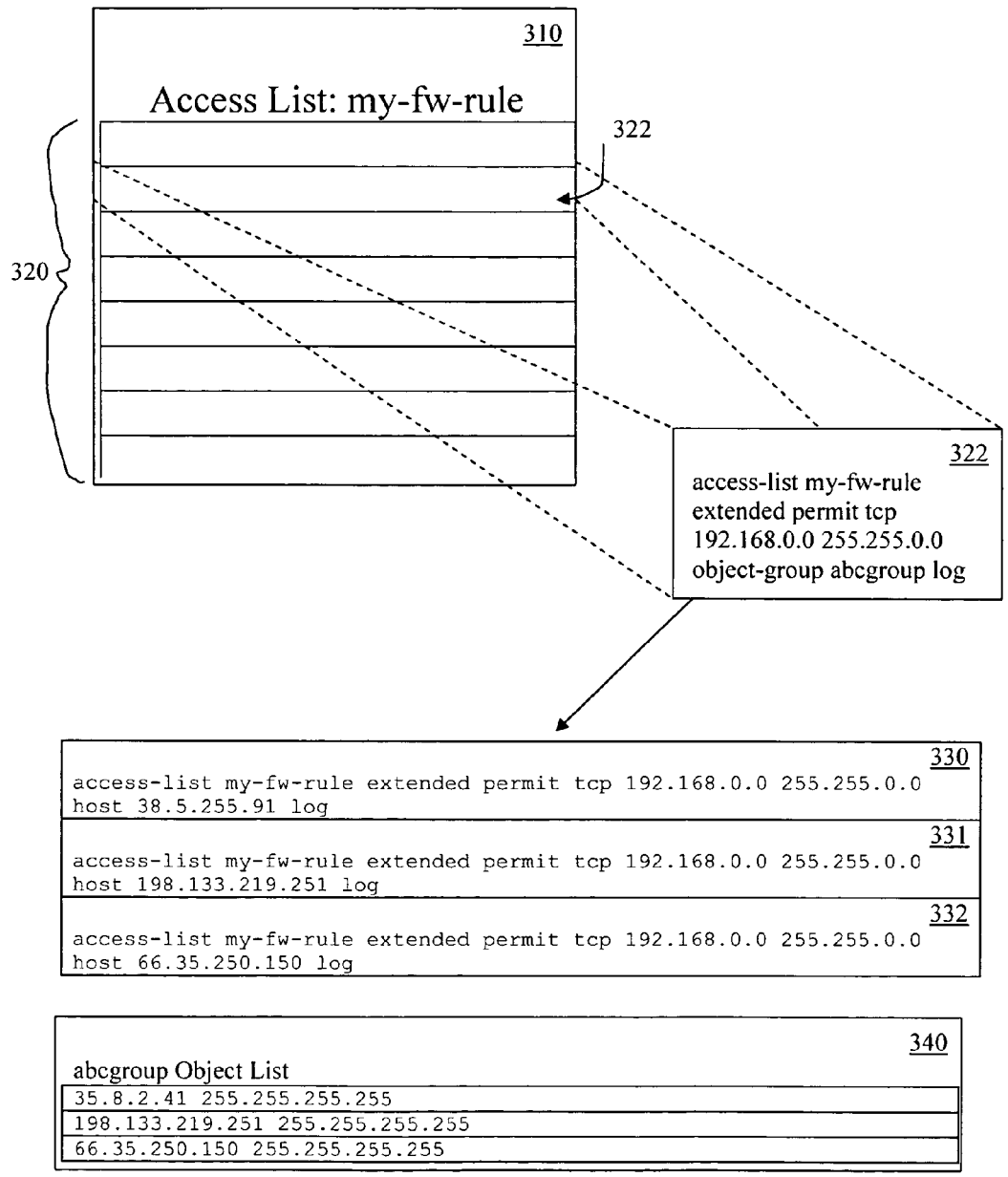
FIG. 3 depicts the relationship between an interface instruction set, a rule, and an extended rule, in accordance with some embodiments of the present invention.

With reference now to FIG. 3, the relationship between an interface instruction set, a rule, and an expanded rule is depicted, in accordance with one embodiment of the present invention. In some embodiments, rules can be used to govern traffic flow through an event handling device, e.g., network security appliance 100. In some embodiments, rules can govern traffic to an event handling device, e.g., when trying to manage the device using ASDM. In some embodiments, rules can govern traffic from the event handling device, e.g., to ping from the device to see if a destination can be reached. An interface instruction set can be applied specifically to one interface, to multiple interfaces, or to all interfaces (globally) in an event handling device. Further, in some embodiments, interface instruction sets and the present invention may be utilized on non-inline devices, e.g., devices running in "promiscuous" mode. Some such devices, e.g., a sniffer and an Intrusion Detection System (IDS), sit on a network and monitor traffic. The interface instruction sets utilized in such embodiments does not alter traffic flow, but does generate events based on rules, and hence can benefit from the application of the present invention.

In some embodiments, an access list, such as access list 310, is utilized in conjunction with network security appliance 100 to govern and restrict the flow of network traffic. In the depicted embodiment, access list 310 defines my-fw-rule, a collection of rules permitting or denying certain traffic flow through network security appliance 100, an ASA/PIX FWSM firewall. Access list 310 is made up by a number of rules, here shown as access list entries (ACE) 320, including rule 322.

Rule 322, as depicted in this embodiment, specifies an action for network security appliance 100 to take if traffic matching the criteria specified in this rule is received by network security appliance 100. As shown, rule 322 instructs network security appliance 100 permit network traffic to flow if it meets the following guidelines: the traffic must adhere to the TCP protocol; the traffic must originate from within the specified subnetwork, e.g., an IP address within the 192.168.0.0 range, with a network mask of 255.255.0.0; and the network traffic must be directed to an element in the abcgroup object list. The specific format of rule 322, as shown in FIG. 3, is intended to be exemplary only, and is not intended to be limiting. Embodiments of the present invention can be utilized with nearly any format of interface rule.

TABLE 1

| abcgroup Object List | | |
|---|---|---|
| abcgroup: | 38.5.255.91 255.255.255.255 | |
| | 198.133.219.251 255.255.255.255 | (site 250) |
| | 66.35.250.150 255.255.255.255 | (site 255) |

Because rule 322 specifies that traffic must be directed to a element in the abcgroup object list, rule 322 has several expanded forms, or separate expanded rules, that correspond to the entries in the abcgroup object list 340, reproduced above in Table 1. These expanded rules are shown in FIG. 3 as expanded rules 330, 331, and 332. If rule 322, instead of specifying the TCP protocol, had specified an object list containing two allowable protocols, a total of six expanded rules would result. The more object lists that are utilized in defining a rule, and the longer the object lists themselves are, the greater the number of expanded rules that will result.

Figure 4:
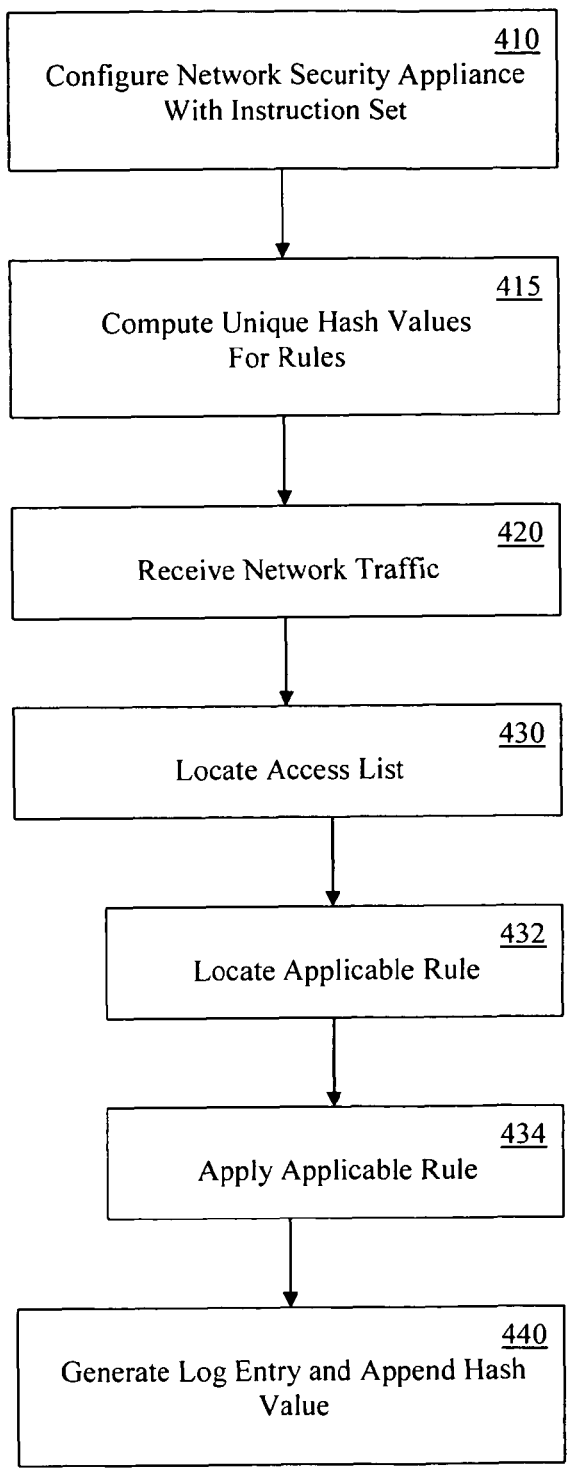
FIG. 4 is a flowchart showing the behavior of a network security appliance, in accordance with one embodiment of the present invention.

With reference now to FIG. 4, a flowchart 400 showing the behavior of a network security appliance is provided, in accordance with one embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference now to step 410 and FIGS. 1-3, network security appliance 100 is configured with access list 310. In some embodiments, access list 310 is loaded into memory 120 via a network connection. In other embodiments, access list 310 is retrieved automatically by network security appliance 100 from some nonvolatile storage (not shown). In still further embodiments, network security appliance 100 is configured by ASDM 225. During step 410, network security appliance 100 is also instructed as to which interface or interfaces access list 310 applies to. In one embodiment, this is accomplished by using an access group configuration, as shown below in Table 2. This access group configuration applies access list "my-fw-rule" to an interface designated as "inside," e.g., an interface regulating traffic that flows from the inside of a network, such as interface 110.

TABLE 2

| Access Group Configuration |
|---|
| access-group my-fw-rule in interface inside |

With reference now to step 415 and FIGS. 1-3, unique hash values for every rule in access list 310 are stored in memory 120. In some such embodiments, unique hash values for every expanded rule in access list 310 are also stored. In some embodiments, these unique hash values are calculated by processor 125, by applying a hash function to every rule in access list 310. Each such resulting hash value will identify a single rule, or expanded rule, in access list 310. In some embodiments, a one-way hash function is utilized, such that the original rule or expanded rule cannot be reconstructed from the resulting hash value. Such embodiments include situations where a rule is unlikely to compress significantly, and it is desirable to avoid a longer and variable length value. In other embodiments, particularly where rules are expected to be very long, a similar approach, using a compression algorithm rather than a hash function, can be used that does allow the original rule or expanded rule to be reconstructed.

Not every embodiment of the present invention relies upon pre-generated hash values, as is discussed in greater detail with reference to step 432.

With reference now to step 420 and FIGS. 1-3, network security appliance 100 receives network traffic over a network connection. For example, if client computer 224 attempted to access site 250 on the Internet 210, traffic would flow along network infrastructure 215, through network connection 195, and enter network security appliance 100 through interface 110.

With reference now to step 430 and FIGS. 1-3, network security appliance 100 locates an applicable interface instruction set to apply to received traffic. Continuing the example from above, network traffic that enters through interface 110, here the "inside" interface, is subject to access list 310.

With reference now to step 432 and FIGS. 1-3, network security appliance 100 locates an applicable rule. In some embodiments, only a single rule is applied to network traffic, regardless of the number of rules within the interface instructions that the traffic meets the conditions of. In such embodiments, a priority can be given to rules that appear higher on the access list. In other embodiments, multiple rules could be applied to network traffic. Continuing the above example, network security appliance 100 locates, e.g., using known methods, an applicable rule from access list 310, for example rule 322.

In some embodiments, such as those that implement step 415, the location of an applicable rule also entails locating the associated hash value or hash values. In several such embodiments, if an expanded rule is applicable, the hash value for both the rule and the applicable expanded rule is located. In other embodiments, only one hash value is retrieved.

In other embodiments, including some of those that do not implement step 415, step 432 includes calculating a hash value, or hash values, that will uniquely identify the applicable rule and/or expanded rule.

With reference now to step 434 and FIGS. 1-3, network security appliance 100 applies the applicable rule to the network traffic. Continuing the example from above, if client computer 224 attempts to access site 250, rule 322 would permit such access, provided that the TCP protocol were used. Client computer 224 is from the appropriate subnetwork, and is attempting to access a site on the abcgroup object list.

With reference now to step 440 and FIGS. 1-3, network security appliance 100 generates a syslog entry reflecting the application of rule 322 to the network traffic from client computer 224. In some embodiments, this step includes appending the hash value or values that correspond to the rule or expanded rule that was applied network traffic to the log entry. In some embodiments, multiple hash values can be combined into a single hash value. An exemplary log entry is shown below in Table 3.

TABLE 3 syslog entry

106100: access-list my-fw-rule permitted tcp inside/192.168.141.21(32811) -> outside/198.133.219.251 (80) hit-cnt 1 [0xc340cd4e, 0xac893db1]

In the exemplary syslog entry provided, 106100 identifies the type of syslog entry follows, in that every syslog entry of type 106100 conforms to the same format. The keyword "access-list" appears in all syslog entries of type 106100. The action taken, permitted, appears next, indicating that the requested traffic was permitted to occur. The protocol of the traffic, tcp, is specified. Next, the originating interface, inside, and the originating IP address and port, 192.168.141.21(32811), site 250, are identified. The destination interface, outside, and the destination IP address and port, 198.133.219.251(80), are given. Hit-cnt 1 identifies the number of times this particular rule has been invoked. The two hexadecimal numbers appearing at the end of the syslog entry are unique identifiers, indicating that this log entry was the result of the application of rule 322, and expanded rule 330, to network traffic.

One important element is that the record made of the application of a rule includes a hash value that uniquely identifies the applicable rule. Further, some embodiments will utilize two hash values, one to identify the expanded rule that was applied, and one to identify the rule the expanded rule was derived from. In some such embodiments, if no expanded rule is applicable, e.g., if the rule does not use any object lists, a placeholder hash value can be used in a syslog entry. As mentioned above, some embodiments will combine two or more hash values into a single hash value.

A number of advantages can be realized through the utilization of the hash values. First, every hash value will uniquely identify the rule from which it was made; unlike sequential rule numbering, the addition, deletion, or reordering of rules within access list 310 will not result in a mismatch, and unlike any rule numbering, the deletion from and subsequent restoration of a rule on access list 310 will cause no confusion. Second, these unique hash values can be re-created at any time, on any device having access to the hash function used and access list 310; unlike both sequential rule numbering and unique rule numbering, embodiments of the present invention can be easily used across even large numbers of network devices, without needing to keep the rule set on every such device exactly uniform. Third, unlike printing out the entire rule in every syslog entry, the expense of storing and appending one or two hexadecimal numbers is acceptably low.

Figure 5:
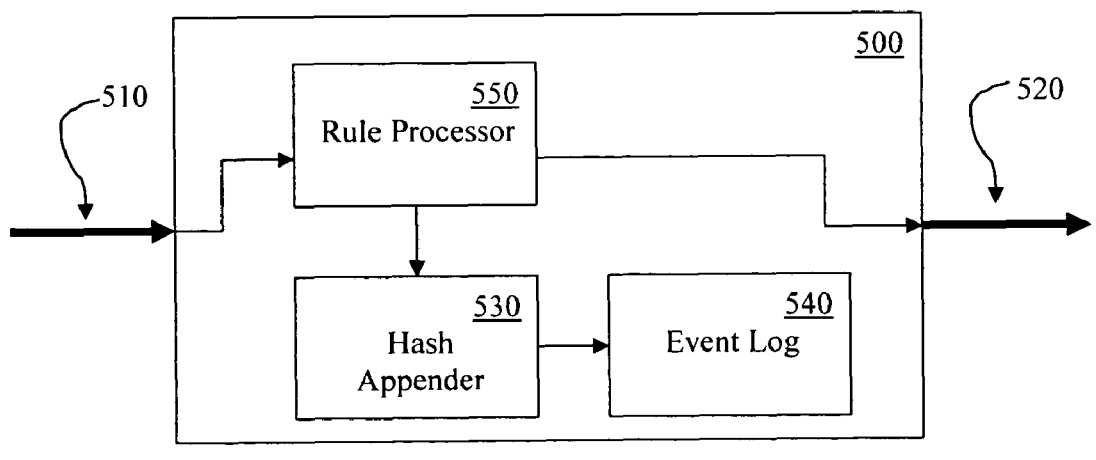
FIG. 5 depicts an event handling device, upon which embodiments of the present invention have been implemented.
Figure 6:
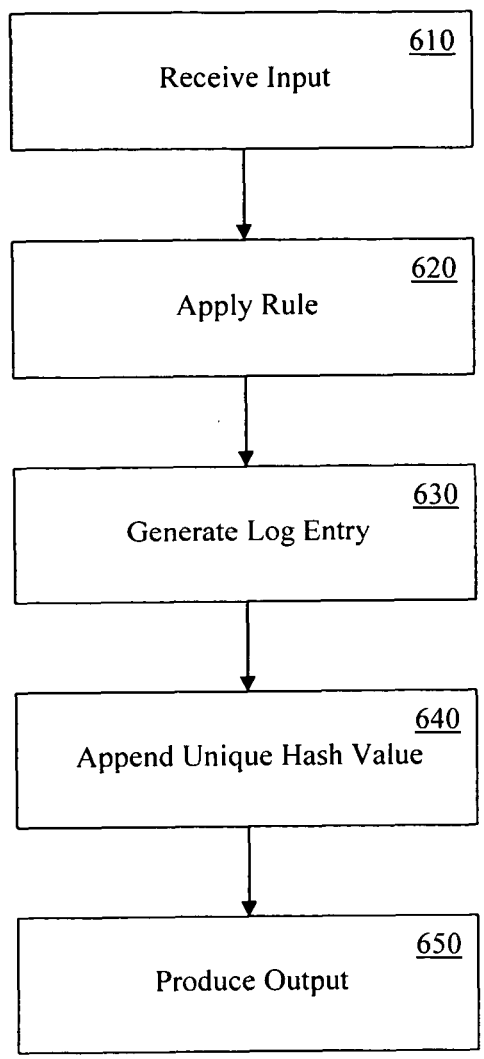
FIG. 6 is a flowchart of a method for utilizing an event handling device, in accordance with some embodiments of the present invention.

As was noted previously, embodiments of the present invention can be applied to other situations than network security appliances, such as network security appliance 100. Any device that applies rules to data, and generates a log to reflect the application of those rules, is well suited to the application of the present invention. With reference now to FIGS. 5 and 6, several such embodiments are depicted.

With reference now to FIG. 5, an event handling device 500 is depicted, in accordance with one embodiment of the present invention. Event handling device 500 is depicted as having an input line 510, where data is received into event handling device 500, and an output line 520, where data flows out of event handling device 500. Within the event handling device 500, a rule processor 550 applies one of a set of rules to data flowing from input line 510. Event handling device 500 incorporates an event log 540, where entries reflecting the application of the rule by rule processor 540 are stored. Event handling device 500 also incorporates hash appender 530, for appending unique hash values to the event log entries, each hash value corresponding to one of the set of rules.

With reference now to FIG. 6, a flowchart depicting a method of utilizing an event handling device is provided, in accordance with one embodiment of the present invention. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference now to step 610 and FIG. 5, event handling device 500 receives input over input line 510. The nature of this data, and the manner of its delivery into event handling device 500 varies in different embodiments. For example, if event handling device 500 is a network traffic routing device, then input data is likely to take the form of network packets. In another embodiment, where event handling device 500 is implemented as part of the operating system for a computer, event handling device 500 may be part of a memory access control mechanism, and the data received a request for memory allocation.

With reference now to step 620 and FIG. 5, event handling device 500 and rule processor 550 locates and applies in applicable rule to the data input. In a traffic routing device, the application of a rule could entail, for example, reference to network address translation tables. In a memory access control mechanism, application of a rule might entail a location of available memory consistent with the priority assigned to a given request.

With reference now to step 630 and FIG. 5, event handling device 500 and rule processor 550 generates an appropriate log entry, for storing in event log 540.

With reference now to step 640 and FIG. 5, hash appender 530 appends a unique hash value to the log entry generated in step 630. This unique hash value identifies the specific rule that was applied to the input, and is generated from the rule itself. This approach that ensures that any system having access to both the hash function used to generate hash value, and rule said the available to event handling device 500, can identify which rule was used to generate a particular log entry.

With reference now to step 650 and FIG. 5, if any output is required, event handling device 500 outputs the appropriate data over output line 520.

Figure 7:
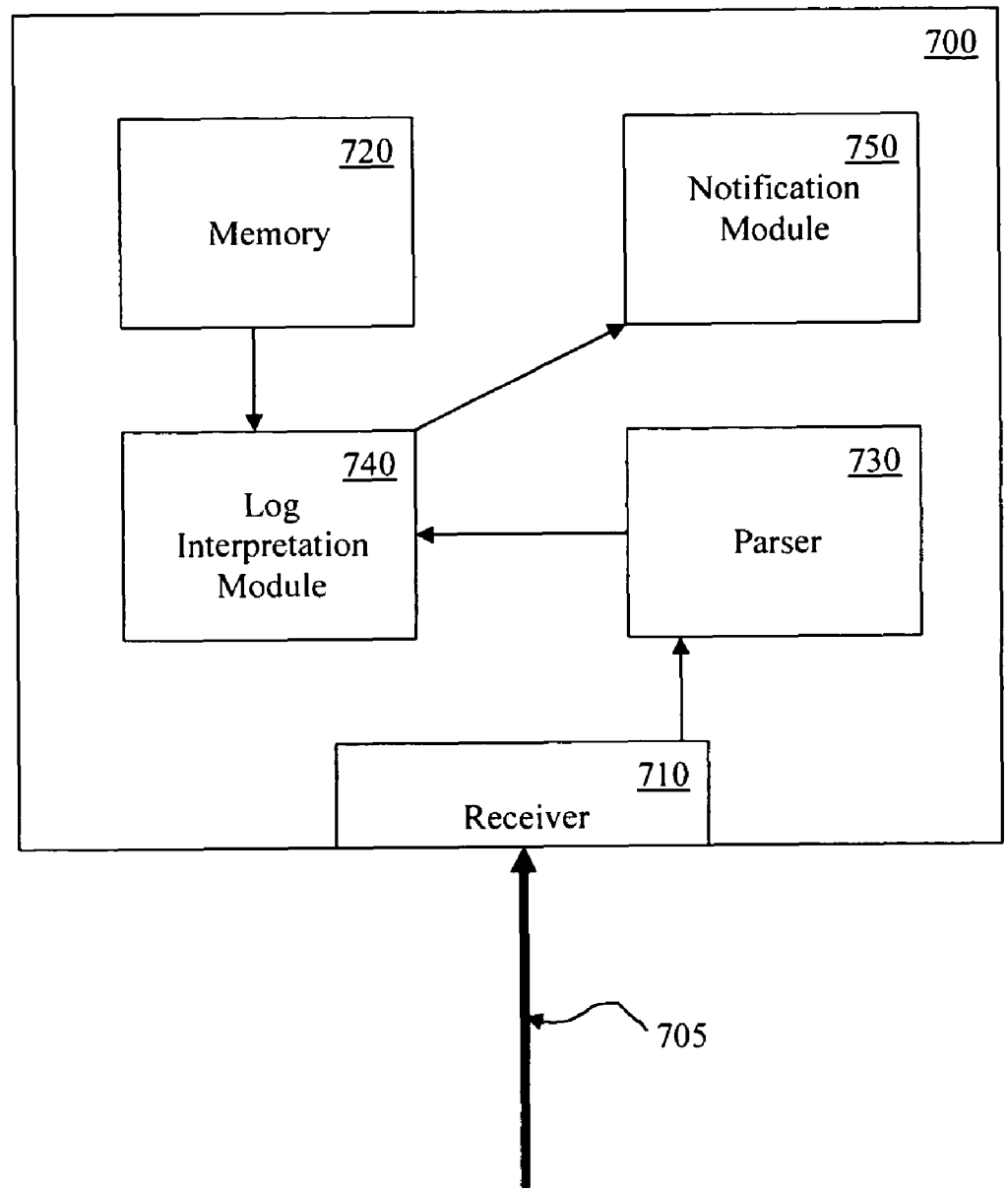
FIG. 7 depicts a system log manager, upon which embodiments of the present invention have been implemented.

With reference now to FIG. 7, a block diagram of a system log manager is depicted, in accordance with one embodiment of the present invention. System log manager 700, in this embodiment, is intended for use alongside a network security appliance, such as network security appliance 100, or any event handling device, such as event handling device 500. In some embodiments, system log manager 700 is implemented entirely as software, for example, as part of the computer system attached to a network, or sometimes as part of the network security appliance system log manager 700 is associated with. In other embodiments, system log manager 700 is implemented entirely as a separate hardware device, and is communicatively coupled to a network including a network security appliance. In other embodiments, system log manager 700 is implemented as a combination of hardware and software. In other embodiments, system log manager 700 can take other forms. In many embodiments, system log manager 700 receives system logs from multiple event handling devices, e.g., as part of a network including several network security appliances.

In some embodiments, system log manager 700 is part of a full-service application, such as an Adaptive Security Device Manager (ASDM). In other embodiments, system log manager 700 is implemented as part of the event handling device, or as a stand-alone system log receiving/interpreting tool, e.g., a command line tool provided on a network security appliance or other event handling device.

As depicted, system log manager 700 includes a receiver module 710. The receiver module receives system log entries from a monitor device, e.g., over dateline 705. System log manager 700 includes a parser 730, for parsing system log entries, both to separate out hash values and to make interpretation and/or classification of system log entries easier. As depicted, system log manager 700 also includes memory 720, for storing and retrieving data, e.g., interface instruction sets and hash tables. System log manager 700 is also shown as having log interpreter module 740, which associates particular log entry with the specific rule and/or extended rule that generated it. System of manager 700 also includes, in some embodiments, notification module 750. Notification module 750 is used to send a signal, in some embodiments, to a user to notify them of the occurrence of a particular event, as detected by the log interpretation module 740. In some embodiments, parser 730, log interpretation module 740, and notification module 750 may be incorporated into fewer or more software or hardware modules.

Figure 8:
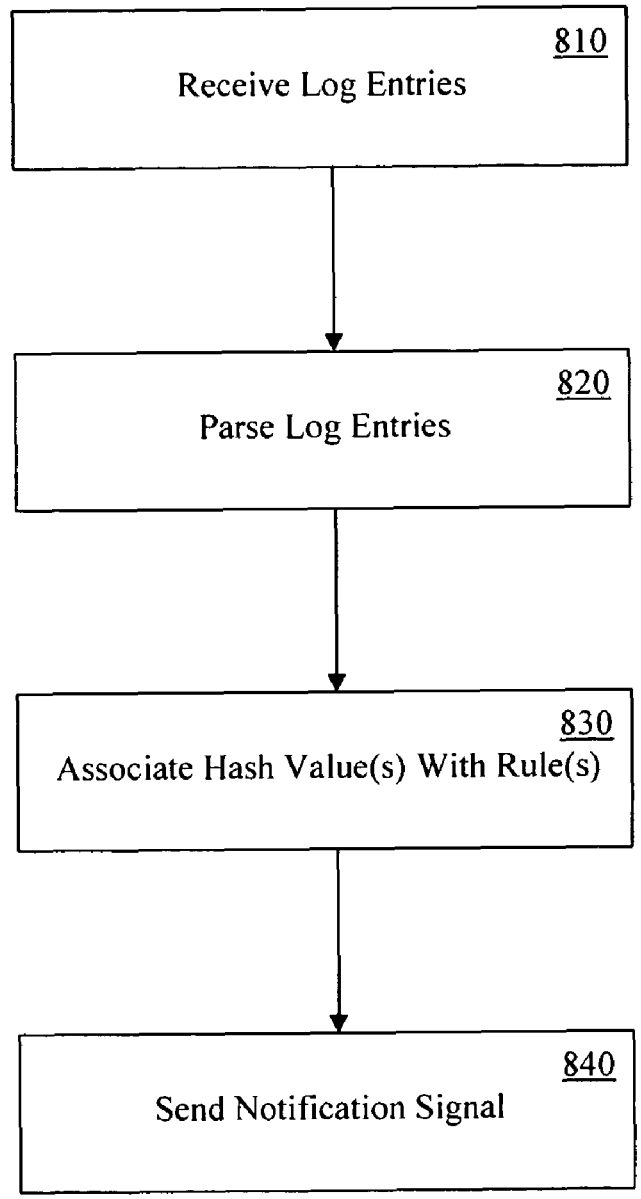
FIG. 8 is a flowchart of a method for utilizing a system log manager, in accordance with some embodiments of the present invention.

With reference now to FIG. 8, a flowchart depicting a method of associating a log entry with the rule that generated that log entry is depicted, in accordance with one embodiment of the present invention. Although specific steps are disclosed in flowchart 800, such steps are exemplary. That is, embodiments of the present invention are well suited to performing various other (additional) steps or variations of the steps recited in flowchart 800. It is appreciated that the steps in flowchart 800 may be performed in an order different than presented, and that not all of the steps in flowchart 800 may be performed.

With reference now to step 810 and FIGS. 1-3 and 7, system log manager 700 receives a system log entry or entries from a device being monitored. In some embodiments, where system log manager 700 is part of a network, e.g. network 200, system log manager 700 can receive system log entries from one or more network security appliances, e.g., network security appliance 100. In some embodiments, system log entries received will be streamed constantly over a connection, e.g. data line 705, into receiver 710. In other embodiments, system log entries will be transmitted in bulk, e.g., every X minutes, over a connection to the device being monitored. For example, if client computer 224 attempts to contact site 250, network security appliance 100 will permit that traffic to occur, in accordance with rule 322 and extended rule 330. Network security appliance 100 will generate a system log entry, e.g., as shown in Table 3, which will be streamed to system log manager 700, and received via receiver 710.

With reference now to step 820 and FIGS. 1-3 and 7, system log manager 700, via parser 730, will parse the received system log entry. In some embodiments, such parsing occurs as soon as a system log entries received. In other embodiments, received system log entries are stored, e.g., in memory 720, and a patch for such entries will be parsed at one time. In some embodiments, system log entries will contain a single hash value. In other embodiments, system of entries will contain two, or potentially more, hash values. Continuing the example from above, the system log entry generated by network security appliance 100 in response to rule 322 and extended rule 330 will be parsed by parser 730, such that the hash values included in that log entry are available to system log manager 700.

With reference now to step 830 and FIGS. 1-3 and 7, system log manager 700 and log interpreter module 740 associate the system log entry with the rule that generated it. In some embodiments, system log manager 700 has a complete set of the interface instruction sets utilized by all devices attached to system log manager 700, including all the rules and extended rules available to these devices. Additionally, system log manager 700, in some embodiments, includes the hash function(s) utilized by attached devices to generate unique hash values for each of these rules and extended rules. In some of these embodiments, system log manager 700 pre-generates the hash values for each of these rules and extended rules, and stores these values until they are needed, e.g., in memory 720. In other embodiments, system log manager 700 generates hash values for these rules are set rules as needed. In other embodiments, system log manager 700 is preloaded with these hash values, e.g., they are stored in memory 720. Given the hash value or values associated with the system log entry, the stored interface instruction sets, and either the stored hash values in memory or the ability to generate the hash values from the rules, log interpreter module can determine precisely which rule and/or extended rule was responsible for the generation of the system log entry. Continuing the sample from above, log interpreter module 740 cross-references the hash values from the log entry with the stored hash values that correspond to access list 310, and determines that the system log entry was the result of rule 322 and extended rule 330.

In some embodiments, system log manager 700 can be configured to operate in or near real-time. In such embodiments, system log manager 700 can also be utilized to watch for the application of a particular rule or rules in real-time. In some such embodiments, step 840 is utilized. With reference now to step 840 and FIGS. 1-3 and 7, system log manager 700 and notification module 750 can send out a notification of the occurrence of a system log entry that resulted from a particular rule. Such embodiments also require that system log manager 700 can be configured to watch for the occurrence of a particular rule, e.g., through the use of a user interface (not shown), or by configuring memory 720. For example, in an ASDM system, a user can select a system log message, and the system will respond by displaying or highlighting the specific rule and/or expanded rule that generated the log entry. System log manager 700 can be configured, in some embodiments, to determine whether or not a particular rule, set of rules, or extended rules are being triggered as they should be. In other embodiments, system log manager 700 can be configured to watch for, e.g., traffic to or from a specific site or client or subnet, or information sent using a particular protocol, or any other element that shows up in a rule or extended rule. Continuing the example from above, log manager 700 can be configured to watch for any traffic that was directed to site 250, and to send a notification signal, e.g., an e-mail, to a system administrator.

By associating an event handling device, e.g., a network security appliance, with a system log manager such as system log manager 700, a user or a demonstrator deems useful functionality, in that it is easy to associate a system log entry with a particular rule or extended rule, and in some cases therefore also with an originating or destination source. In embodiments where a graphical user interface is used as part of system log manager 700, it becomes particularly easy to notify a user or administrator of the status of his network, and the invocation of a rule or rules that are of particular interest to him.

Embodiments of the present invention are thus described. While the present invention has been described in particular embodiments, it should be appreciated that the present invention should not be construed as limited by such embodiments, but rather construed according to the following claims.

What is claimed is:

1. An apparatus comprising:
an event handling device to receive network traffic and to forward the network traffic towards a destination endpoint when the network traffic conforms to one or more rules in an access list, wherein the one or more rules comprise at least one main rule configured to reference one or more extended rules that further define one or more attributes of the at least one main rule, and wherein the event handling device is configured to generate one or more log entries responsive to an application of one or more of the main rule and at least one of the extended rules to the network traffic when determining whether to allow the network traffic to pass towards the destination endpoint;
an event log, communicatively coupled to the event handling device, wherein the event log is configured to store the one or more log entries generated by the event handling device; and
a value generator to generate a first unique hash value of one specific extended rule which prompted the event handling device to generate a corresponding log entry, generate a second unique hash value of one specific main rule in the access list from which the specific extended rule was derived and append the first and second hash values to the one or more log entries.

2. The apparatus of claim 1, wherein the at least one main rule in the access list is configured to include an object identifier to identify an object list having one or more destinations for the network traffic, and wherein the one or more extended rules are configured to identify corresponding destinations for the network traffic based on the one or more destinations for the network traffic in the object list.

3. A network security appliance, comprising:
an interface to receive network traffic; and
a system processor to apply an access list having a plurality of rules associated with the interface to the network traffic and to forward the network traffic towards a destination endpoint when the network traffic conforms to the plurality of rules in the access list, wherein the plurality of rules in the access list comprise at least one main rule configured to reference one or more extended rules that further define one or more attributes of the at least one main rule,
wherein the system processor is configured to generate at least one system log entry according to the application of the at least one of the extended rules to the network traffic, and wherein the at least one system log entry includes a unique identifier of a rule having a highest priority among rules applied by the system processor and having prompted the system processor to generate the corresponding system log entry, and wherein the unique identifier is generated directly from the rule having the highest priority among the rules applied by the system processor, and
wherein the system processor is further configured to append a first unique hash value to the system log entry as the unique identifier of an extended rule applied to the network traffic which prompted the system processor to generate the system log entry, and to append a second unique hash value to the system log entry corresponding to the main rule in the access list from which the extended rule was derived.

4. The network security appliance of claim 3, further comprising: a plurality of interfaces to receive the network traffic, wherein the system processor is configured to apply different sets of rules to the network traffic based on which interface the network traffic was received.

5. The network security appliance of claim 3, wherein the at least one main rule that is configured to include an object identifier to identify an object list having one or more destinations for the network traffic, and wherein the one or more extended rules are configured to identify corresponding destinations for the network traffic based on the one or more destinations for the network traffic in the object list.

6. The network security appliance of claim 3, wherein each unique identifier is a pre-generated hash value of a corresponding rule and stored in a system memory.

7. The network security appliance of claim 3, further comprising: a hash value generator to apply a hash function to each of the plurality of rules in order to generate the unique identifier.

8. The network security appliance of claim 3, wherein the at least one system log entry is stored in a system memory.

9. The network security appliance of claim 3, further comprising: an output data port to transmit the at least one system log entry to an external system log manager.

10. The network security appliance of claim 3, wherein the interface is configured to provide a connection to a communications network, and wherein the plurality of rules regulates network traffic on the communications network.

11. A method comprising:
receiving a system log entry generated responsive to a determination of whether to forward network traffic towards a destination endpoint based, at least in part, on an application of one or more rules in an access list to the network traffic, wherein the one or more rules comprise at least one main rule configured to reference one or more extended rules that further define one or more attributes of the at least one main rule, wherein the at least one main rule that is configured to include an object identifier to identify an object list having one or more destinations for the network traffic, and wherein the one or more extended rules are configured to identify corresponding destinations for the network traffic based on the one or more destinations for the network traffic in the object list;
parsing the system log entry to identify a first unique hash value and a second hash value both appended to the system log entry, and wherein the first unique hash value was generated directly from a corresponding rule; and
associating the first unique hash value with the at least one main rule and associating the second unique hash value with one of the extended rules, wherein the system log entry was created responsive to the application of the at least one main rule associated with the first unique hash value and the one of the extended rules.

12. The method of claim 11, further comprising:
generating a plurality of unique hash values, wherein each of said plurality of unique hash values results from the application of a hash function to one or more of said plurality of rules.

13. The method of claim 11, further comprising:
accessing a plurality of unique hash values, wherein each of said unique hash values corresponds to a single rule of said plurality of rules.

14. A syslog manager, comprising:
an interface device to receive a plurality of system log entries, wherein each of the system log entries was generated responsive to a determination of whether to forward network traffic towards a destination endpoint based, at least in part, on an application of at least one rule in an access list to the network traffic, wherein the at least one rule comprise at least one main rule configured to reference one or more extended rules that further define one or more attributes of the at least one main rule, wherein the at least one main rule that is configured to include an object identifier to identify an object list having one or more destinations for the network traffic, and wherein the one or more extended rules are configured to identify corresponding destinations for the network traffic based on the one or more destinations for the network traffic in the object list;
means for parsing each of the plurality of system log entries; and
means for associating each of the system log entries with at least one of a plurality of rules that prompted the generation of the corresponding system log entries, wherein the means for associating is configured to determine which of the plurality of rules corresponds to the system log entries based on a first hash value within the system log entries that identifies a specific main rule and is generated directly from the specific main rule and a second hash value that identifies a specific extended rule and is generated directly from the specific extended rule wherein said first and second hash values are appended to the log entries.

15. The syslog manager of claim 14, further comprising:
a processing device to produce a notification signal when the log interpreter identifies one or more of the plurality of rules is associated with a particular system log entry.

16. The syslog manager of claim 15, further comprising:
a user interface to specify which of the plurality of rules will cause the means for producing to produce the notification signal.

17. The syslog manager of claim 15, wherein the plurality of system log entries are received as a data stream, and wherein the means for parsing is configured to parse the plurality of system log entries and the means for associating is configured to associate the plurality of system log entries with corresponding rules in real time.

18. The syslog manager of claim 14, wherein the syslog manager is part of a network security appliance.

19. The syslog manager of claim 14, wherein the syslog manager is communicatively coupled to a communications network.

20. The syslog manager of claim 14, wherein the syslog manager is an adaptive security device manager (ASDM).

* * * * *